D. S. CHAFFIN.
HORSE HAY-FORK.
No. 176,509. Patented April 25, 1876.
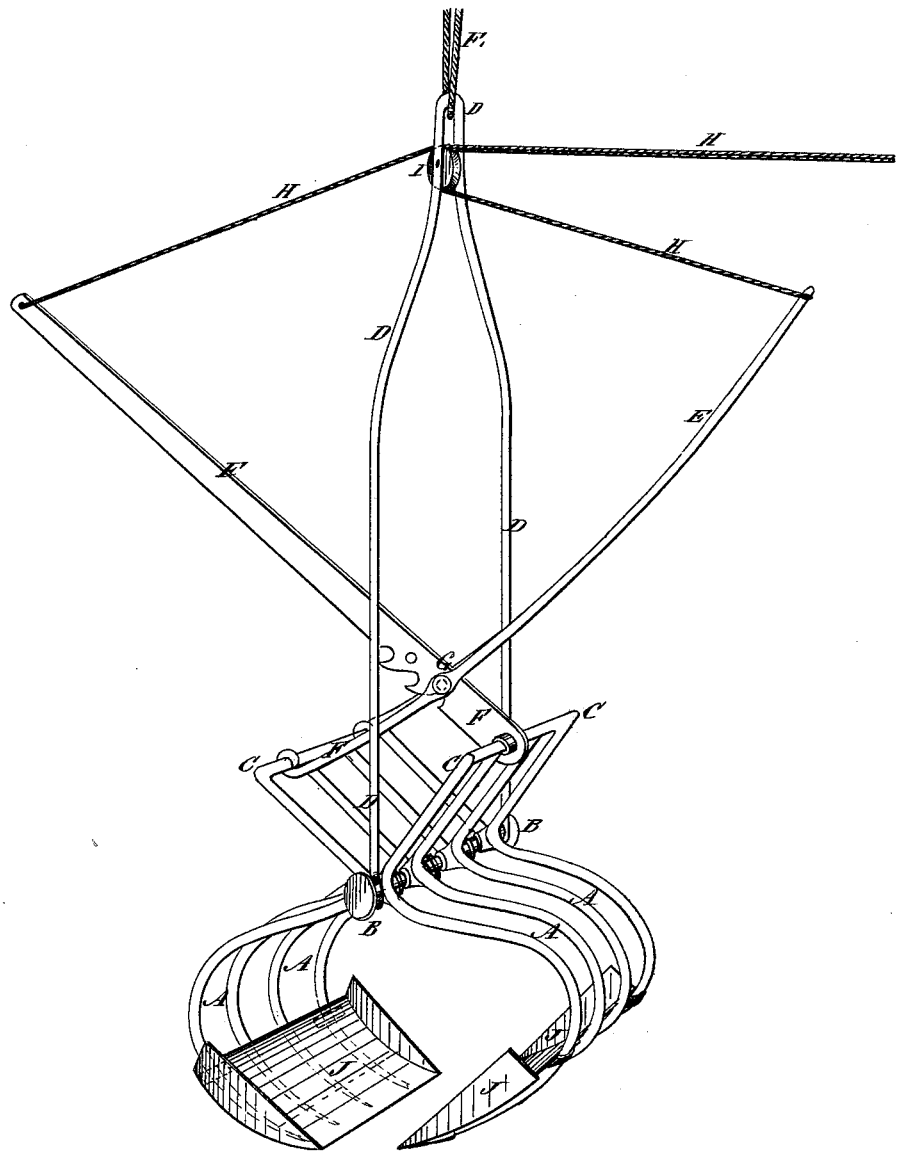

UNITED STATES PATENT OFFICE.

DAVID S. CHAFFIN, OF VINTON, IOWA.

IMPROVEMENT IN HORSE HAY-FORKS.

Specification forming part of Letters Patent No. 176,509, dated April 25, 1876; application filed February 14, 1876.

*To all whom it may concern:*

Be it known that I, DAVID S. CHAFFIN, of Vinton, in the county of Benton and State of Iowa, have invented a new and useful Improvement in Horse Hay-Forks, of which the following is a specification:

The figure is a perspective view of my improved fork.

The object of this invention is to furnish an improved fork for handling hay, manure, and other similar articles by horse-power, and which may also be used for removing stones, mud, &c., from the bottom of shallow streams and ponds, and for various other purposes, and which shall be simple in construction, easily and conveniently operated, strong, durable, and not liable to get out of order.

The invention will first be fully described in connection with drawing, and then pointed out in the claim.

A are the tines, which are curved and pivoted to each other, and two or more of which may be used upon each side. The tines A are pivoted to each other by a bolt, B, and upon their upper ends or shanks are formed rigid bails C. To the ends of the bolt B at the opposite sides of the fork are pivoted the ends of the bail or clevis D, to the bend of which is attached the rope or chain E, by which the machine is raised and lowered. To the bails C of the tines A are pivoted the lower ends of two levers, F, which are pivoted to each other by a pin or bolt, G. The lower end of one of the levers F is slotted or forked for the other to pass through, and the inner lever has several holes or notches formed in it to receive the pivoting pin or bolt G, so that the fork may be locked with the points of the tines close together or at any desired distance apart. To the ends of the levers F are attached ropes H, which pass over a pulley, I, pivoted to the upper part of the bail or clevis D. The ropes H extend into such a position that they may be conveniently reached and operated by the operator.

By this construction the levers F enable the tines A to be forced into the load with any desired force, and when pressed down they lock the said tines securely. By this construction also the weight of the fork and load is entirely supported by the bail or clevis D, so that the levers F may be easily operated by the trip-rope H to discharge the load.

For handling mud, sand, and other fine substances, plates J are used, which are curved to correspond with the curvature of the tines A, and have sockets formed upon their lower or convex sides to receive the said tines, as shown in the figure.

The plates J have flanges formed upon their side edges, to increase their holding capacity, and may be detached from the tines A when not required for use.

Having thus described my invention, I claim as new and desire to secure by Letters Patent—

The combination of the levers F, pivoted to each other at G, and one of said levers having notches for shifting the position of the pivot, with the pivoted tines A, suspension-bail D, and cords H, as and and for the purpose set forth.

DAVID S. CHAFFIN.

Witnesses:
   D. E. VORIS,
   HOMER JAMES.